United States Patent [19]

Moriguchi et al.

[11] 4,408,212
[45] Oct. 4, 1983

[54] MULTI-COLOR RECORDING DEVICE

[75] Inventors: Fujio Moriguchi; Masami Kurata, both of Ebina, Japan

[73] Assignee: Fuji Xerox Co., Ltd., Tokyo, Japan

[21] Appl. No.: 344,692

[22] Filed: Feb. 1, 1982

[30] Foreign Application Priority Data

Feb. 5, 1981 [JP] Japan ................................ 56-15042

[51] Int. Cl.³ .......................................... G01G 15/10
[52] U.S. Cl. ................................ 346/76 PH; 346/46; 400/120
[58] Field of Search .................. 346/76 PH, 76 R, 46, 346/105; 400/120; 250/316.1

[56] References Cited

U.S. PATENT DOCUMENTS 4,067,017  1/1978  Dertouzos .............................. 346/46
4,365,254 12/1982  Ozawa ........................ 346/76 PH X Primary Examiner—Joseph W. Hartary
Attorney, Agent, or Firm—Sughrue, Mion, Zinn, Macpeak and Seas

[57] ABSTRACT

In a multi-color recording device having a plurality of recording stations, the back roller pressure and recording sheet transport is provided by a belt passing around rollers at each recording station and extending from one station to the next in contact with the recording paper.

4 Claims, 2 Drawing Figures

MULTI-COLOR RECORDING DEVICE

BACKGROUND OF THE INVENTION

This invention concerns a multi-color recording device that records multiple colors by using a plurality of heat sensitive recording heads and thermally transferring inks of different hues on a single recording paper sheet at respective positions, and more specifically, it relates to a multi-color recording device capable of preventing positional displacement on the recording paper sheet of the images recorded at each of the heat sensitive recording heads.

In a heat transfer recording device, ink donor sheets each coated with heat fusible solid ink on one surface of a substrate are used, and heat is selectively supplied from thermal heads to the ink donor sheets in accordance with picture information. Then, the ink thus fused is transferred to the recording paper sheets for recording of information. Accordingly, multi-color recording can be carried out by preparing a plurality of ink donor sheets which are each coated with solid inks of different hues, and by successively conducting heat transfer recording on one recording paper sheet with these ink donor sheets.

FIG. 1 shows a conventional multi-color recording device based on the foregoing principle. In this device, a first ink donor sheet 1 is supplied from a first feed roll 2 and then is taken up by way of a guide roll 3, a thermal head 4 and another guide roll 5 onto a take-up roll 6. A second ink donor sheet 7 is supplied from a second feed roll 8 and is thereafter taken-up by way of a guide roll 9, thermal head 10 and another guide roll 11 onto a take-up roll 12 in the same manner. In a first recording region 13 in which the first thermal head 4 and the first ink donor sheet 1 are in contact with each other, a first pressure roll 15 rotated in the direction of an arrow 14 upon recording is contacted and, when a recording paper sheet (ordinary paper) 16 advances into the first recording region 13, the first pressure roll 15 urges the sheet under pressure against the ink surface of the ink donor sheet 1 and conveys the recording paper in the direction of an arrow 17 at a speed equal to the circumferential speed of the pressure roll 15. In this case, the first thermal head 4 selectively causes its heat generation members to generate heat based on red color picture information, for example, to thereby transfer the red ink from the first ink donor sheet 1 onto the recording paper sheet 16.

The recording paper sheet 16 sent out from the first pressure roll 15 then advances by way of a guide 18 into a second recoridng region 19 where the second ink donor sheet 7 and the second thermal head 10 are in contact with each other. In the second recording region 19, a second pressure roll 21 rotated in the direction of an arrow 20 upon recording is contacted and, when the recording paper sheet 16 advances into the second recording region 13, the second pressure roll 21 contacts the recording paper under pressure against the ink surface of the second ink donor sheet 7 and sents the sheet forwardly. In this case, the second thermal head 10 causes its heat generation members to generate heat selectively based on the black color picture information, for example, to thereby transfer the black ink from the second ink donor sheet onto the recording paper sheet 16.

In this way, in the foregoing multi-color recording device, picture information for red color and black color are recorded in the two recording regions 13, 19. However, if the distance between the two recording regions 13, 19 is large, the delay time between the supply of the picture signal to the first thermal head 4 and the supply of the picture signal for the same position of the original to the second thermal head 10 has to be increased, which requires a memory of excessively large capacity. Accordingly, the distance between a plurality of recording regions has usually been set as short as possible in the conventional multi-color recording device.

A problem with this, however, is that one recording paper sheet is not always transported by only one pressure roll but it may sometimes be engaged and transported simultaneously by a plurality of pressure rolls. Rubber rolls used for the pressure rolls usually have diameters which vary by several percent. Accordingly, when a recording paper sheet is transported by a plurality of pressure rolls simultaneousely, the circumferential speeds on each of the pressure rolls may differ slightly and, as a result, the transportation speed for the recording paper sheet becomes unstable and color displacement is caused.

SUMMARY OF THE INVENTION

This invention has been made in view of the foregoing and it is an object of this invention to provide a multi-color recording device capable of preventing such color displacement.

According to this invention, the foregoing object can be attained by carrying out the urging of the recording paper sheet under pressure against the ink donor sheet and the transportation of the recording paper sheet through the machine from one station to the next by one belt that runs through each of the recording regions in common.

BRIEF DESCRIPTION OF THE DRAWINGS

This invention will be described in more detail by way of a preferred embodiment with reference to the accompanying drawings, in which.

DETAILED DESCRIPTION OF THE INVENTION

Figure 1:
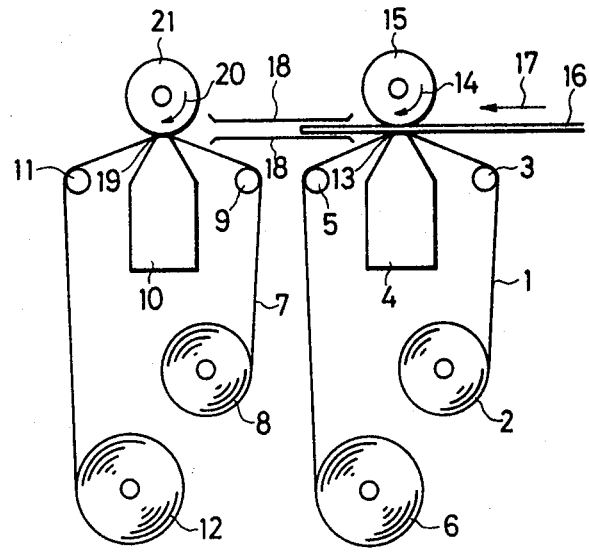
FIG. 1 is a schemtic view of a conventional multi-color recording device.
Figure 2:
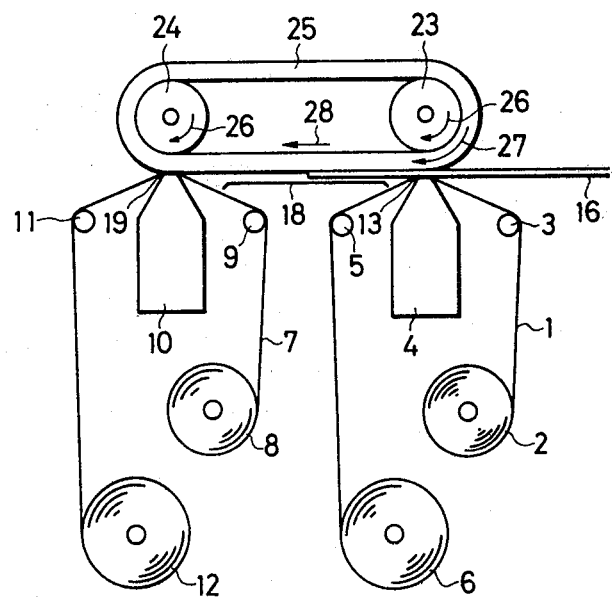
FIG. 2 is a schematic view of a multi-color recording device according to one embodiment of this invention.
Figure 3:
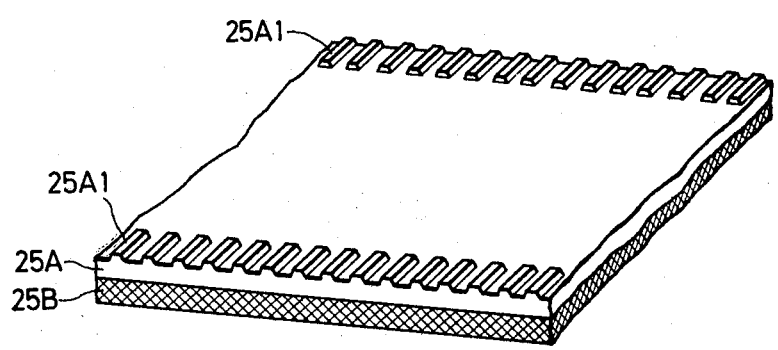
FIG. 3 is an explanatory view illustrating the structure of a pressure belt used in the invention.

FIG. 2 shows a multi-color (two color) recording device in which components identical with those in FIG. 1 carry the same reference numerals. The device comprises first and second thermal heads 4, 10 and a pair of belt pulleys, or driving rolls, 23, 24 separated from each other by a predetermined distance, and one pressure belt 25 laid around the driving rolls. As shown in FIG. 3, the pressure belt 25 comprises a first belt member 25A made of rubber material textured with glass fibers and a second belt member 25B made of rubber material along, which are bonded to each other. The first belt member 25A is formed on both sides with teeth 25A1 each in trapezoidal cross section and at a predetermined pitch, so that when the belt pulleys 23, 24 are driven in the direction of an arrow 26, the belt engages and receives driving force from grooves (not shown) provided on both ends of the circumferential surfaces of the pulleys to run the pressure belt 25 in the direction of an arrow 27 at a prescribed speed. On the other hand, the second belt member 25B receives downward force from the belt pulleys 23, 24 so as to contact the ink donor sheets 1, 7 or the recording paper sheet 16 under pressure in the first and the second recording regions 13, 19.

When an operator starts the operation of the multicolor recording device according to this invention, the recording paper sheet 16 is transported and the leading end thereof arrives near the first recording region 13. Then, a photosensor (not shown) detects the arrival of the recording paper sheet 16 to start the driving of the pair of the belt pulleys 23, 24 and the first and the second feed rolls 6, 12. Thus, the recording paper sheet 16 is guided to the first recording region 13 while sandwiched between the first ink donor sheet 1 and the circumferential surface of the pressure belt 25. Then, heat transfer recording with red ink is carried out in while the sheet is placed under pressure by the pressure belt 25 against the first ink donor sheet 1.

The recording paper sheet 16 is then transported in accordance with the movement of the pressure belt 27 at the same speed as the belt velocity in the direction of an arrow 28. Then, the sheet advances while being guided along the guide 18 into the second recording region 19, where it undergoes heat transfer recording with the black ink, for example. After the completion of the second recording operation, the recording paper sheet is discharged by a discharge roller (not shown) out of the device. A photo-sensor (not shown) detects the point when the rear end of the recording paper sheet 16 passes through the second recording region 19 to thereby stop the driving of the pair of belt pulleys 23, 24 and the first and the second feed rolls 6, 12.

As aparent from the foregoing, since the recording paper sheet is transported successively through each of the recording regions at a predetermined belt speed according to this invention, color displacement due to uneven speed can be prevented. Further, since the sheet can be transported through each of the recording regions while in contact with the same belt, skewing of the recording paper sheet can also be prevented to thereby prevent the occurrence of color displacement in this regard.

Although a two-color recording device has been shown in the embodiment described above, it will be apparent that this invention can also be applied to those recording devices of three or more colors.

What is claimed is:

1. In a multi-color recording device of the type including at least first and second recording stations each including first and second thermal heads, respectively, and a rotatable pressure means for urging a recording paper sheet against said thermal head and for forwarding said recording paper sheet through said recording device, the improvement characterized in that said pressure means comprises a band-like member extending from said first to said second recording stations.

2. A multi-color recording device as claimed in claim 1, wherein said pressure means further comprises a first roller means opposite said first thermal head and a second roller means opposite said second thermal head for urging said recording paper against said first and second thermal heads, respectively, and said bank-like member is carried around both of said roller means.

3. A multi-color recording device as claimed in claim 1 or 2, wherein said band-like member maintains contact with said recording paper sheet as said sheet passes from said first to said second recording stations.

4. A multi-color recording device as claimed in claim 1 or 2, wherein said first recording station includes an ink donor sheet having a first color ink transported past said first thermal head in contact with said recording paper and said second recording station includes an ink donor sheet having a second color ink, different from said first color, transported past said second thermal head in contact with said recording paper.

* * * * *